June 2, 1936.  E. F. DURFEE  2,043,037
METHOD OF PREPARING MINERAL AGGREGATE FOR ROAD SURFACING AND OTHER PURPOSES
Filed Feb. 28, 1935  3 Sheets-Sheet 1

Inventor
Elton F. Durfee
By
Attorneys

June 2, 1936. E. F. DURFEE 2,043,037
METHOD OF PREPARING MINERAL AGGREGATE FOR ROAD SURFACING AND OTHER PURPOSES
Filed Feb. 28, 1935 3 Sheets-Sheet 2

Inventor
Elton F. Durfee
By
Attorneys

June 2, 1936.  E. F. DURFEE  2,043,037
METHOD OF PREPARING MINERAL AGGREGATE FOR ROAD SURFACING AND OTHER PURPOSES
Filed Feb. 28, 1935  3 Sheets-Sheet 3
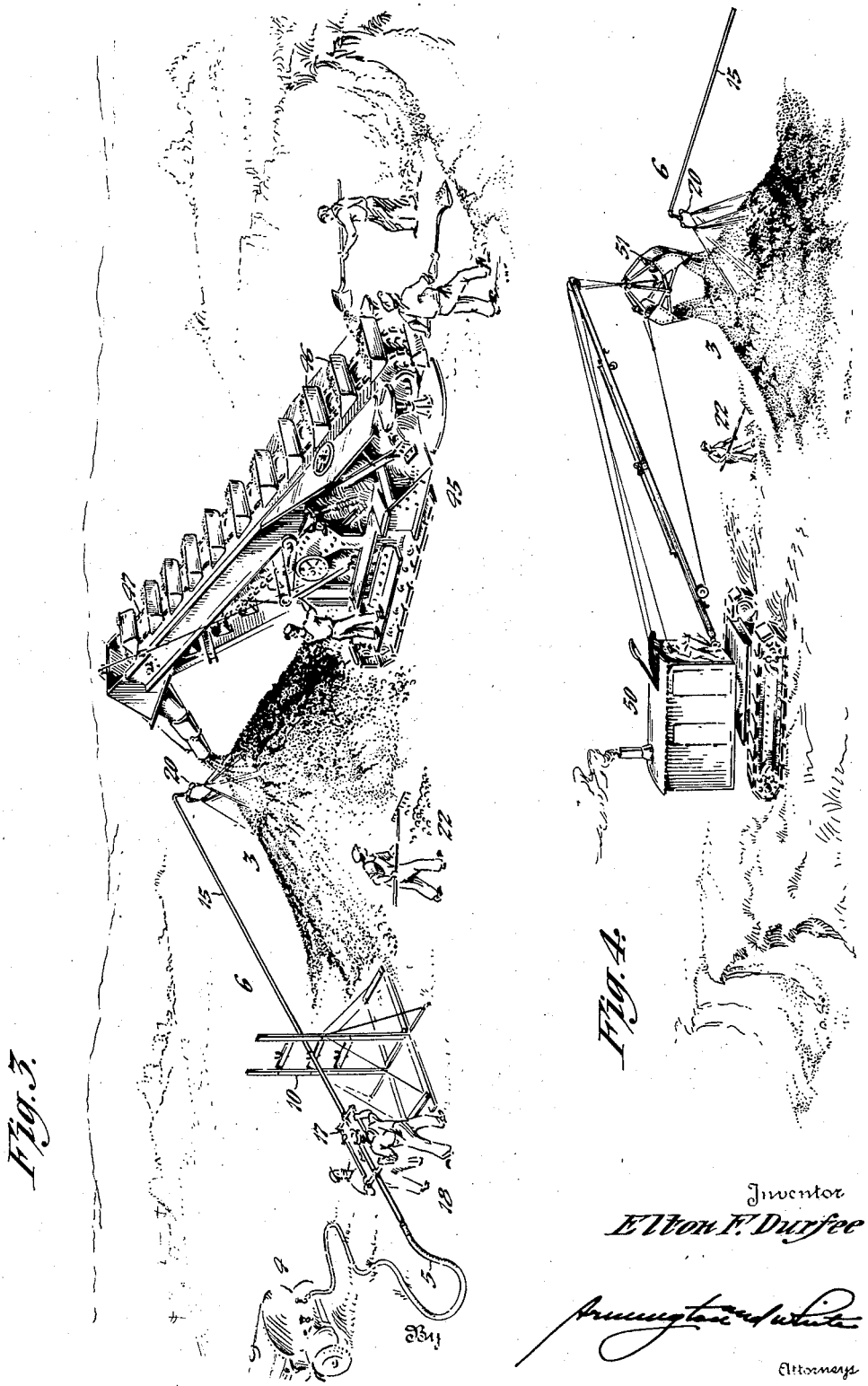

Patented June 2, 1936

2,043,037

UNITED STATES PATENT OFFICE 2,043,037

METHOD OF PREPARING MINERAL AGGREGATE FOR ROAD-SURFACING AND OTHER PURPOSES

Elton F. Durfee, Cranston, R. I., assignor to Koppers Products Company, Pittsburgh, Pa., a corporation of Delaware Application February 28, 1935, Serial No. 8,701

6 Claims. (Cl. 106—31)

This invention relates to a new and improved method or process for treating mineral aggregate with liquid bitumen or an equivalent binding agent to prepare the combined product for use as bitulithic pavement, road-surfacing material and for similar purposes; for example, as a fill or ballast for caissons, piers, bulkheads and the like. In the following specification and claims the term "mineral aggregate" is employed in a general sense to designate sand, gravel, crushed stone, shale, slag, cinders and all other materials suitable for the purposes indicated.

The present invention, in essence, consists in periodically depositing mineral aggregate in measured quantities, preferably by mechanical means, and concomitantly spraying or distributing liquid bitumen or an equivalent binding agent over each deposit or layer thereof to form a stratified pile or mass with layers of the binder alternating with layers of the aggregate. As a result of this process or method the liquid binding agent is caused to intermingle with and permeate through the mineral aggregate to thoroughly coat all the particles thereof. Subsequently, the treated and combined material in the mass may be turned over or otherwise agitated, preferably by mechanical means, to insure thorough mixing of its components.

One object of the present invention is to provide a method or process for preparing mineral aggregate for the purposes indicated which may be worked with inexpensive equipment and a small number of operatives to produce an improved product at a more economical cost than with methods now generally employed.

Another object of the invention is to provide a method or process for treating mineral aggregate to obtain a more complete coating of the particles thereof with the bituminous material whereby to insure a more homogeneous and waterproof pavement to prevent erosion and disintegration.

Another object of the invention is to provide a method or process for preparing mineral aggregate for the purposes indicated by treating it in its natural state without heating the material.

Another object of the invention is to provide an improved method or process for treating mineral aggregate with bitumen whereby the aggregate may be used wet or cold and mixed in moderately low temperatures.

Another object of the invention is to provide a method or process for treating mineral aggregate with a binder without causing coagulation or "balling" of the tar or other bituminous material when or after it is applied.

Another object of the invention is to provide a method or process for treating mineral aggregate with bitumen of relatively high viscosity to improve the quality of the combined product whereof to prevent softening, shifting and rutting of the pavement in warm weather.

Another object of the invention is to provide an improved method or process for treating mineral aggregate to produce a material which may be stored for indefinite periods while undergoing a seasoning or ripening process which ultimately improves the resulting product.

Another object of the invention is to provide an improved method or process for treating mineral aggregate to produce a paving or road-surfacing material which may be laid with practically no traffic interference and without requiring seasoning or hardening in place before being subjected to traffic.

Another object of the invention is to provide an improved method or process for treating mineral aggregate to produce a paving or road-surfacing material which can be laid true to line, grade and cross-section and with greater speed and increased mileage per day over previously used methods.

Another object of the invention is to provide an improved method or process for preparing mineral aggregate for road-surfacing which may be performed by unskilled labor in both mixing and laying the material and without danger of straining curbing or sidewalks adjacent the roadway or being picked up by passing vehicles and pedestrians.

Further objects of the invention are set forth in the following specification which describes, by way of example, several preferred methods of carrying out the process with different types of apparatus or equipment as illustrated by the accompanying drawings. In the drawings:

Fig. 3 is a view showing the use of a bucket-conveyor for conveying and dumping the mineral aggregate on the pile; and Fig. 4 is a perspective view illustrating a crane and clamshell bucket for conveying the mineral aggregate to and dumping it on the pile.

Figure 1:
Fig. 1 is a perspective view illustrating the manner of carrying out the treating and mixing process with the use of one or more steam shovels for handling the mineral aggregate and depositing it for treatment with the binder and for thereafter turning it over in the pile.

The present improved method or process is preferably practiced or performed at or adjacent the source of supply of the mineral aggregate, that is at the location of the gravel bank or bed where the sand or gravel is obtained in its natural state. There exists in most localities, adjacent to cities and towns and contiguous to roads being built, deposits of sand, gravel and earthy material. These materials have not as a rule been found suitable for road building if they contain any considerable amount of earthy material, such as soil or loam, but it has been determined that with the present improved method or process such low grade materials can be used with satisfactory results for producing durable, traffic-resisting pavement.

It has been discovered that while the hard particles of stone are apt to crack and grind away or to be released from the binder, with the present method of treating the mineral aggregate with bitumen or its equivalent a small amount of earth or loam fills the voids, reduces the wear between the harder particles of the material and thereby improves the stability and durability of the pavement. While the material produced by the present improved method or process is not intended for use generally as a pavement for trunk highways or roads having exceptionally heavy traffic; on the other hand, it has been found to give satisfactory service for what are termed secondary roads and highways as well as for driveways, walks, school yards and other similar paved areas.

Since the improved process contemplates the treating and mixing of the material at its source of supply and thereafter transporting it to the work as required, its use entails less interruption of traffic, a very considerable economy in time required for laying, and practically no loss of time for seasoning or hardening when in place. Moreover, it has been determined that the treated material may be laid in wet weather and at moderately low temperatures so that road building and similar work can be carried out over longer periods in localities subject to seasonal variations.

Various types of apparatus may be employed in carrying out the improved method or process and it has been demonstrated that the ordinary steam shovel furnishes the simplest and perhaps least expensive equipment for handling the aggregate. Steam shovels are usually owned by, or available to, practically every town or city government and one or more may be used at the gravel bank in the manner illustrated in Fig. 1 of the present drawings. In this view the steam shovel 2 illustrated in the foreground is depicted as taking the gravel from a bank to convey it to and deposit it on a pile represented at 3. The shovel 2 scoops up bucketfuls of the gravel from the bank, swings around and deposits them at intervals to form the pile 3 of generally conical contour. This procedure requires but one man to operate the shovel and meanwhile two other operatives are employed in spraying the liquid bitumen or other binding agent onto the pile being formed.

In the drawings, the liquid tar or bitumen is shown as being supplied from a tank truck, indicated at 4, through a pipe line or hose 5 delivering to the spraying outfit indicated generally at 6. Conveniently, the spraying apparatus may consist of a portable frame or scaffold 10 comprising skids 11 which rest upon the ground and a pair of uprights 12 braced therefrom. Extending between the uprights 12 are several struts or crossbars 13, each of which may be employed as a rest for the spraying pipe 15. For this purpose the struts 13 are preferably provided with swiveled forks 16, similar to oar-locks, in which the pipe 15 rests to adapt it to be easily manipulated by one or more operators. As herein illustrated the butt end of the pipe 15 is provided with opposite parallel handle-bars 17 adapted to be grasped by two men as shown at 18 in the illustration.

The forward end of the pipe 15 carries one or a plurality of spray nozzles 20 which may be of any preferred type. It has been found that satisfactory results are obtained by using two nozzles 20 connected by suitable elbows and T's with the main pipe 15 and disposed with their discharge ends pointing downwardly. The spraying pipe 15 may be supplied with a valve if desired, but usually the valve connection at the tank is employed for shutting off the flow of tar or bitumen when necessary.

It will be understood that the steam shovel 2 is operated continuously to deposit the gravel or other aggregate at intervals in measured quantities and preferably in such manner that it will build up in a conical heap or pile 3. After each bucketful has been deposited the tar, bitumen or other liquid binder is sprayed onto the top of the pile to spread it over and cover the freshly dumped aggregate. While the shovel is dumping its load the spray pipe 15 is manipulated to move the nozzles 20 out of the way, see the illustration in Fig. 2, this being accomplished by swinging the nozzle end of the pipe 15 to one side or the other or by withdrawing the pipe through its forked support 16. If desired, the supply of bitumen may be shut off as each bucketful of gravel is dumped on the pile but in actual practice this has been found unnecessary. The time required for dumping the bucketful of gravel is so brief that the amount of tar sprayed onto the side of the pile away from its apex is inconsiderable and, in any event, this small quantity of the liquid will eventually seep down into the pile to be mixed with the other portions.

It has been found that by thus applying the aggregate and binder to the mass in alternate layers the pile becomes stratified as indicated at the points designated $a$, $b$, $c$, etc. in Fig. 1. In other words, there is first a layer of aggregate, next a layer of liquid binder, another layer of aggregate and so on throughout the whole mass of material. It will be understood that the liquid bitumen or tar is heated before being supplied to the tank and retains its heat during the whole process. On the other hand, the mineral aggregate or gravel requires no heating as is the case with previously used methods of mixing and therefore a considerable saving in labor, time and expense is accomplished.

During and throughout the process the hot liquid bitumen is extremely fluid and therefore very active, causing it to seep down through and permeate all portions of the mass of aggregate. Moreover, the particles of the aggregate dumped on the apex of the pile are more or less active to roll on the inclined sides thereof and are thus caused to pick up a considerable amount of the bitumen as a coating on their exterior surfaces.

It has also been found that the larger particles or stones in the gravel roll down the sides of the pile to be deposited at its base, due to their greater weight and the effect of gravity thereon. These large stones, which are not usually considered desirable or suitable for the pavement, may be raked out in the manner indicated at 22 in Fig. 1 and the other views of the drawings.

As another most important advantage of the present invention there is no tendency for the liquid bitumen to coagulate or "ball up" during its application to or after it has been deposited on the pile. Heretofore, both with hand and machine methods of mixing the tar is extremely liable to coagulate and form lumps or balls separating particles of the gravel or other aggregate and unless these lumps or balls are removed the material is unfit for pavement or road-surfacing.

After the material has been treated with the liquid binder in the manner as before described it is preferable to turn the mass over to insure that all the particles are completely coated with the tar. This final operation may be accomplished by operating the steam shovel to pick up bucketfuls of the mixture from the base of the pile, raise them and dump them over on the opposite side until all of the mass has been turned over. The same steam shovel may be employed for this purpose or, where the process is being practiced on a larger scale, one shovel may be used for forming the piles and a second shovel employed for turning them over as indicated at 25 in the background of the illustration of Fig. 1. In this manner a series of piles of the aggregate may be formed and treated and each batch turned over while another pile is being formed and treated. The treated and mixed material may be trucked or otherwise transported to its destination as indicated at 26 in Fig. 1 or it may be stored for indefinite periods even in the winter months. It has been found that the product is improved by a seasoning or ripening process during storage and therefore the preferred practice is to prepare it in advance of requirement for use.

Figure 2:
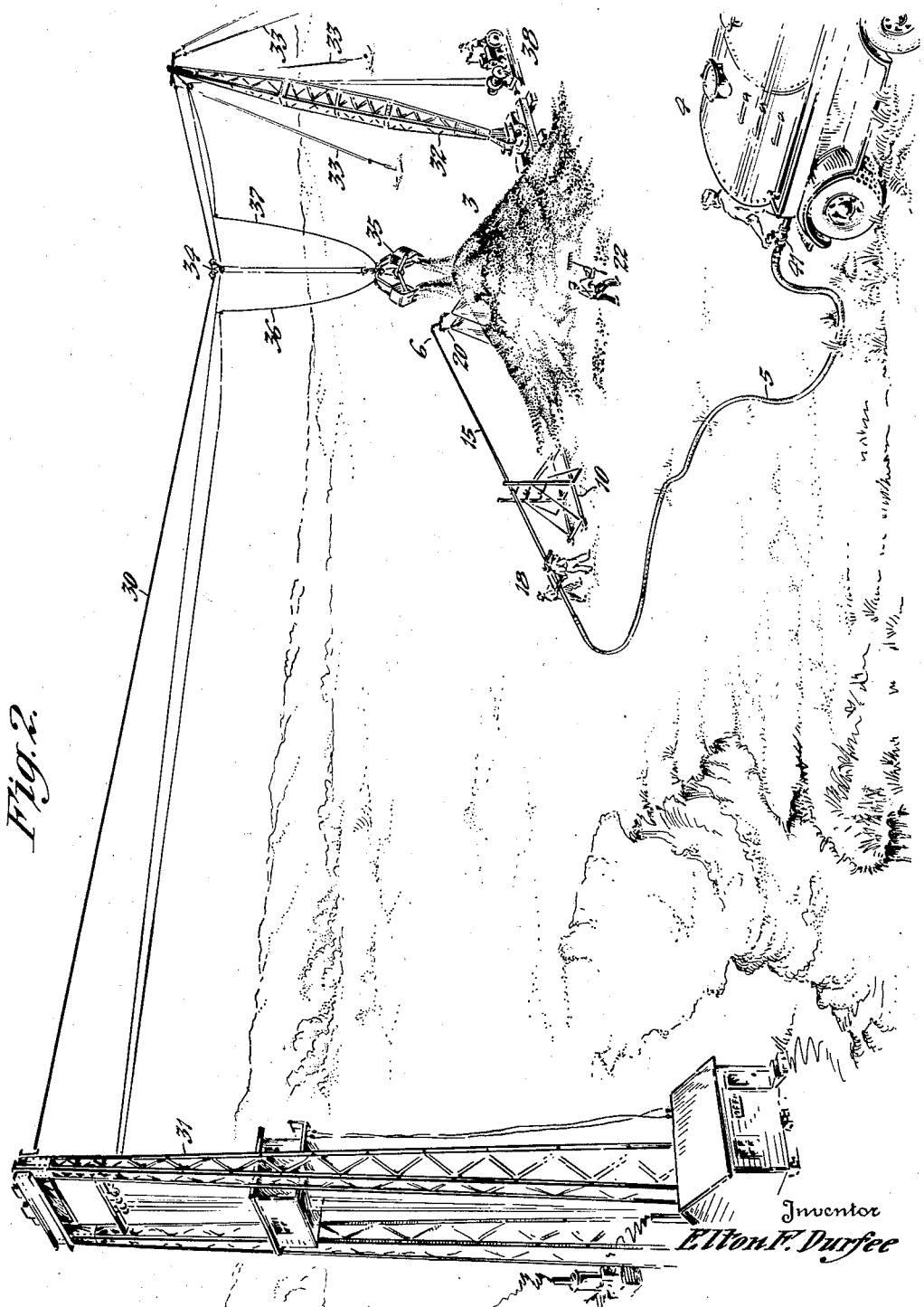
Fig. 2 is a perspective view showing the process as being performed with the use of a drag line for conveying the mineral aggregate to the pile where it is treated with bitumen or other binder.

Fig. 2 of the drawings illustrates a different form of apparatus for practicing the present improved process. Where a relatively large bed of gravel is available a drag line may be erected for excavating, transporting and dumping the aggregate in piles. As shown in the illustration, a cable 30 is suspended between a tower 31 and a portable mast or boom 32 stayed by suitable guys 33. A trolley 34 travelable on the cable 30 has suspended therefrom a so-called clamshell bucket 35. The bucket 35 is controlled by suitable cables 36 and 37 operated by a motor or steam winch, indicated at 38, to excavate the gravel, convey it to and dump it upon the pile indicated at 3. As with the equipment shown in Fig. 1, the heated liquid bitumen is supplied from a tank truck 4 through a pipe line 5 to the spray pipe 15 which terminates in the nozzles 20. The spray pipe 15 is supported by a scaffold 10 to be manipulated by one or more operatives indicated at 18 so that as the aggregate is dumped on the pile the nozzles may be moved out of the way. If desired, an operator may be stationed at the tank valve 41 to shut off the supply of tar during the dumping of the aggregate although, as before stated, this is not essential. While this latter form of equipment is somewhat more expensive to install than that previously described, it has certain advantages where an extensive supply of the aggregate is available.

Fig. 3 of the drawings illustrate another type of equipment which may be used with the present improved method or process, the apparatus consisting primarily of a bucket-conveyor indicated at 45. The buckets 46 on the traveling conveyor belt 47 may be employed to scoop up the gravel, or they may be filled by hand as indicated, and the conveyor may be operated substantially continuously or with an intermittent motion. That is to say, the gravel may be dumped at intervals by a relatively slow advance of the buckets and the tar sprayed on during the intervals between the dumping; or the conveyor may be operated to discharge a certain number of bucketfuls and its action then arrested while the tar is sprayed on. In either case the aggregate and binder are deposited in alternate layers in the same manner and for the same purpose as previously explained.

Fig. 4 illustrates the use of equipment comprising a traveling crane 50 with clamshell bucket 51 operated therewith; this apparatus taking the place of the steam shovel shown in and described with reference to Fig. 1 of the drawings. The last-mentioned type of apparatus has some advantages for excavating gravel below the level of operations; its method of use being substantially the same as that with the steam shovel first described. That is to say, the aggregate is excavated from a pit and transferred to the pile 3 where it is discharged in measured quantities and the tar applied at the apex of the pile to spread it over each bucketful previously deposited.

For producing road-surfacing material by the present improved method or process the two ingredients are supplied in certain proportions. It has been found that as a satisfactory formula eighteen gallons of bitumen are applied for each cubic yard of aggregate, the tar content being approximately six per cent. of the aggregate in weight, although this may vary with different kinds of material. As a convenient method of measuring the proportion of the two materials, a tank containing one thousand gallons of tar is used to supply the proper quantity of binder for fifty-five cubic yards of gravel, the rate of flow of the bitumen being regulated to exhaust the tank when this number of cubic yards has been dumped on the pile. The batch of approximately fifty-five cubic yards of aggregate saturated and mixed with the bitumen constitutes a convenient quantity of material for handling, storing and transporting by trucks to the location of the work. However, it is to be understood that the above specified formula is not controlling, the proportions of the ingredients being variable as desired and in accordance with different kinds of materials.

By the practice of the present method or process with any suitable equipment an improved product is obtained with the mineral aggregate thoroughly mixed and coated with the liquid binder. The improved process also effects important economies, particularly as requiring only a small number of operatives and practically no skilled labor. Further economies result from the fact that the mineral aggregate may be used in its natural state, wet or cold, without sizing or grading and without heating the aggregate which is necessary when the latter is mixed by previously used methods such as in a concrete mixer.

The present method or process may be practiced in rainy or cold weather and the pavement laid at moderately low temperatures so that the usual season for road building may be extended considerably under climatic conditions which ordinarily prohibit such work.

As the material is prepared at its source of supply an accumulation of machinery at, and its traverse over, the work is avoided so that less labor is required on the job and greater mileage can be completed within a given time. This results in less obstruction to traffic and further, since the material requires no seasoning after laying, interruption of traffic is avoided.

As another important advantage of the invention, road-building or surfacing can be carried on with much greater cleanliness without staining curbstones and sidewalks with tar spilled from oil trucks and spreaders; and due to the thorough mixing of the material there is less danger of the tar being picked up and thrown about by vehicles or pedestrians traversing the roadway. As the material comes to the work ready-mixed the pavement can be more easily laid true to line, grade and cross-section than with mixed-in-place methods.

As a further advantage of the present improved method or process, bitumen of high viscosity may be used for the binder so that the finished pavement is rendered more homogeneous with a harder surface having less tendency to erosion, creeping or rutting in warm weather.

While the improved method or process is herein described as practiced with the use of certain types of equipment, as contemplating a product composed of specified materials and as adapted for certain purposes, it is to be understood that it can be carried out with other forms of apparatus, with the use of different materials, and the improved product may be applied to other uses than those herein named without departing from the spirit or scope of the invention. Therefore, without limiting myself in this respect, I claim:

1. An improved method of preparing pretreated mineral aggregate for subsequent use in paving and for other purposes consisting in periodically discharging the aggregate in measured quantities to form a pile; and distributing a liquid binding agent over each separate quantity of aggregate deposited on the pile to form a stratified mass with layers of binder alternating with layers of aggregate.

2. That process for preparing pretreated mineral aggregate for subsequent use in road-surfacing and for other purposes which consists in conveying the aggregate from a source of supply; intermittently discharging it in measured quantities to form a pile; and spraying a liquid binding agent on each quantity of aggregate deposited on the pile to form alternating strata of aggregate and binder to cause the latter to permeate the material to coat the particles thereof.

3. That process for preparing pretreated mineral aggregate for subsequent use as paving, fill or ballast which consists in discharging the aggregate at intervals in measured quantities to form a heap or pile; and concomitantly spraying liquid bitumen on the apex of the pile after each separate discharge of the aggregate to form a stratified mass with the bitumen permeating therethrough to thoroughly coat the particles of aggregate.

4. A method of supplying prepared material for subsequent use in road-surfacing and for other purposes consisting in mechanically conveying mineral aggregate from its source of supply; periodically discharging the aggregate from the conveyor in measured quantities to form a pile; and concomitantly spraying bituminous liquid onto the apex of the pile to cover and saturate each layer of aggregate applied thereto to cause it to permeate the material to coat the particles thereof.

5. A method of preparing pretreated mineral aggregate for subsequent use in road-surfacing and for other purposes consisting in mechanically excavating the material and continuously conveying it to an adjacent location; periodically discharging the aggregate from the conveyor in measured quantities to form a pile; and spraying a bituminous binder on the pile to cover each layer of aggregate applied thereto to cause it to permeate the material to coat the particles thereof.

6. A method of preparing pretreated mineral aggregate for subsequent use in road-surfacing and for other purposes consisting in excavating the material from its source of supply by means of a mechanical conveyor, steam shovel or the like; periodically dumping the material in measured quantities to form a pile; and mechanically spraying a liquid binder on the apex of the pile after each dumping operation to form a stratified mass with the binder permeating therethrough to coat the particles of aggregate.

ELTON F. DURFEE.